United States Patent [19]

Kinouchi et al.

[11] Patent Number: 5,565,925
[45] Date of Patent: Oct. 15, 1996

[54] IMAGE SUB-SAMPLING APPARATUS

[75] Inventors: Shigenori Kinouchi; Akira Sawada, both of Tokyo, Japan

[73] Assignee: NEC Corporation, Tokyo, Japan

[21] Appl. No.: 513,409

[22] Filed: Aug. 10, 1995

Related U.S. Application Data

[63] Continuation of Ser. No. 139,716, Oct. 22, 1993, abandoned.

[30] Foreign Application Priority Data

Oct. 26, 1992 [JP] Japan ................................. 4-287230

[51] Int. Cl.⁶ .............................. H04N 7/24; H04N 7/30
[52] U.S. Cl. ...................... 348/424; 348/392; 348/405
[58] Field of Search ........................... 348/27, 384, 390, 348/392, 400–405, 409–412, 419, 420, 423, 424; 382/232, 236, 238, 248–251; H04N 7/130, 7/133

[56] References Cited

U.S. PATENT DOCUMENTS

| | | | |
|---|---|---|---|
| 5,018,010 | 5/1991 | Masumoto ............................... | 348/424 |
| 5,072,295 | 12/1991 | Murakami et al. ...................... | 348/405 |
| 5,369,502 | 11/1994 | Fukuda et al. .......................... | 348/423 |
| 5,371,549 | 12/1994 | Park ......................................... | 348/402 |

FOREIGN PATENT DOCUMENTS 0447269  9/1991  European Pat. Off. ........ H04N 7/133

OTHER PUBLICATIONS

Patent Abstracts of Japan, vol. 17, No. 393, Jul. 1993.
Wallace et al., "The JPEG Still Picture Compression Standard", IEEE Transactions on Consumer Electronics, vol. 38, No. 1, Feb. 1992, pp. xviii–xxxiv.
Patent Abstracts of Japan, vol. 16, No. 326, Jul. 1992.
Patent Abstracts of Japan, Katsutoshi, vol. 16, No. 326, Jul. 16, 1992.

*Primary Examiner*—Tommy P. Chin
*Assistant Examiner*—Richard Lee
*Attorney, Agent, or Firm*—Sughrue, Mion, Zinn, Macpeak & Seas

[57] ABSTRACT

A quantization coefficient is inputted to an inverse quantization circuit. The coefficient is multiplied by a quantization step size stored in a quantization table. Resultant data is delivered to an inverse discrete cosine transformation circuit. The quantization step size is attained by replacing each value of a high-frequency portion of the quantization table with "0" by a masking circuit. As a consequence, each value of inversely quantized data associated with the portion is set to "0". Data inversely transformed according to a transformation expression is fed to a sub-sampling circuit. Based on an n specification signal, the data is sub-sampled such that a dot is extracted for every n dots, thereby generating a compressed image signal. Aliasing noise is prevented by the masking a portion of the quantization table, and the sub-sampling ratio can be varied.

2 Claims, 2 Drawing Sheets

IMAGE SUB-SAMPLING APPARATUS

This is a continuation of application No. 08/139,716 filed Oct. 22, 1993, now abandoned.

BACKGROUND OF THE INVENTION

The present invention relates to an image sub-sampling apparatus, and in particular, to an image sub-sampling apparatus for use in an operation to receive and to reproduce an image encoded according to a discrete cosine transformation and a linear quantization for decoding the image.

DESCRIPTION OF THE RELATED ART

Heretofore, data represented by image signals to be transmitted or to be stored on a storage medium such as a memory card or a magnetic disk is commonly compressed to have a reduced data capacity in consideration of a limited capacity of the storage device or the like. In this case, the image data compression is carried out as follows.

An image is subdivided into a plurality of blocks such that data of pixels constituting each subdivided block is transformed, for example, through a discrete cosine transformation. Transformation coefficients resulting from the operation are finally quantized so as to encode the data.

The image data thus encoded is subjected, in reception and reproduction phases thereof, to an inverse quantization and an inverse discrete cosine transformation so as to be decoded into the original signal. In the decoding step, to obtain a minimized image signal, there is achieved an operation to sub-sample signals constituting the image.

As the conventional method of sub-sampling image signals, there has been used a method in which the sub-sampling operation is effected in the unit of n dots after the inverse discrete cosine transformation, a method in which the n-dot sub-sampling operation is conducted after the signals are passed through a low-pass filter, or a method in which only the direct-current (dc) components of the encoded data are subjected to the inverse quantization so as to produce an output signal without achieving the inverse discrete cosine transformation.

Referring now to FIGS. 1 to 3, description will be given of image sub-sampling apparatuses respectively of these three types.

FIG. 1 shows a first example of the conventional image sub-sampling system.

The apparatus of FIG. 1 conducts only the n-dot sub-sampling operation above. As can be seen from this diagram, the system includes an inverse quantization circuit 11, a quantization table 12, an inverse discrete cosine transformation circuit 13, and a sub-sampling circuit 14.

The circuit 11 receives as an input thereto a quantization coefficient Sq configured in an 8-element by 8-element matrix to inversely quantize the coefficient Sq. In the operation, a quantization step size Q stored in the quantization table 12 is read therefrom to be multiplied by the coefficient Sq, thereby producing data R. The obtained data R is input to the circuit 13, which then conducts an inverse discrete cosine transformation for the data R to thereby create output data r. The data r is fed to the circuit 14 to be sujected to an n-dot sub-sampling operation, thereby generating conpressed image signal In the apparatus constituted as above, the quantization coefficient Sq (V,U) in the form of an (8×8) matrix is first delivered to the circuit 11. The quantization step size O(V, U) registered to the table 12 is multiplied by each element of the matrix so as to produce inversely quantized data R(V, U). The data R(V, U) is then supplied to the circuit 13 to undergo an inverse transformation such that the resultant data is input to the circuit 14. The data r(V, U) produced from the circuit 13 is subjected an n-dot sub-sampling operation in the circuit 14 thereby creating compressed image data $S_2$. For example, assuming n=4, there are produced four items r(0, 0), r(0, 4), r(4, 0), and r(4, 4).

FIG. 2 shows a second example of the image sub-sampling device of the prior art. In this system, data is delivered to a low-pass filter such that the resultant data is subjected to the n-dot sub-sampling operation. This configuration is different from that of FIG. 1 in that a low-pass filter is disposed between the circuits 13 and 14.

The filter 16 reduces the size of a frequency band of the data r(V, U) to 1/n thereof.

The system of FIG. 2 operates substantially in the same fashion as the apparatus of FIG. 1 excepting that the data r(V, U) is passed through the filter 16.

FIG. 3 shows a third example of the conventional image sub-sampling device. As can be seen from the diagram, in this system, the inversely quantized data produced from the circuit 11 is fed to a dc component extracting circuit 17 to extract dc components therefrom so as to accomplish the image sub-sampling operation without achieving the inverse transformation.

This constitution is different from that of FIG. 1 in that the dc extracting circuit 17 is connected to an output terminal of the circuit 11 so that the circuit 17 produces a compressed image signal $S_2$. In this operation, only a dc component R(0, 0) is extracted from the coefficient R(V, U) so as to deliver the obtained data as the compressed image $S_2$.

Of these apparatuses, the apparatus of FIG. 1 achieving only the n-dot sub-sampling operation is attended with an aliasing noise. Moreover, the system of FIG. 2 includes the low-pass filter to prevent the aliasing noise so as to achieve the n-dot sub-sampling operation after the data is passed through the filter 16. This consequently leads to a drawback that the apparatus is expensive due to adoption of the filter 16.

In addition, in the device of FIG. 3, only the dc components are extracted from the inversely quantized data, thereby achieving the sub-sampling operation without conducting the inverse transformation. The system however has a disadvantage that the sub-sampling ratio is fixed. Furthermore, the apparatus is advantageous in that the operation time is reduced when software processing is employed for the operation. However, in a large scale integrated circuit including a circuit dedicated to the discrete cosine transformation and the inverse discrete cosine transformation circuit, the processing time cannot be reduced and hence the above advantage is obtained even when the configuration of FIG. 3 is adopted.

SUMMARY OF THE INVENTION

It is therefore an object of the present invention to provide an image sub-sampling apparatus capable of preventing an aliasing noise without necessitating such an expensive device as a low-pass filter.

Another object of the present invention is to provide an image sub-sampling apparatus capable of selecting an image sub-sampling ratio.

In accordance with the present invention, there is provided an image sub-sampling apparatus operative in an encoding operation of image data encoded by a discrete cosine transformation and a linear quantization for sub-sampling the image data. The apparatus includes inverse quantization means for linearly and inversely quantizing a quantization coefficient according to a quantization table and thereby producing inversely quantized data, a quantization table to be used in the linear and inverse quantization by the inverse quantization means, inverse discrete cosine transformation means for conducting an inverse discrete cosine transformation for the data created from the inverse quantization means, and sub-sampling means for sub-sampling the data generated from the inverse discrete cosine transformation means to acquire a dot for every n-dots in each of the vertical and horizontal directions of the data and thereby producing therefrom an image signal. The quantization table includes a high-frequency portion of which each value is set to "0".

BRIEF DESCRIPTION OF THE DRAWINGS

The objects and features of the present invention will become more apparent from the consideration of the following detailed description taken in conjunction with the accompanying drawings wherein.

DESCRIPTION OF THE PREFERRED EMBODIMENTS

Figure 4:
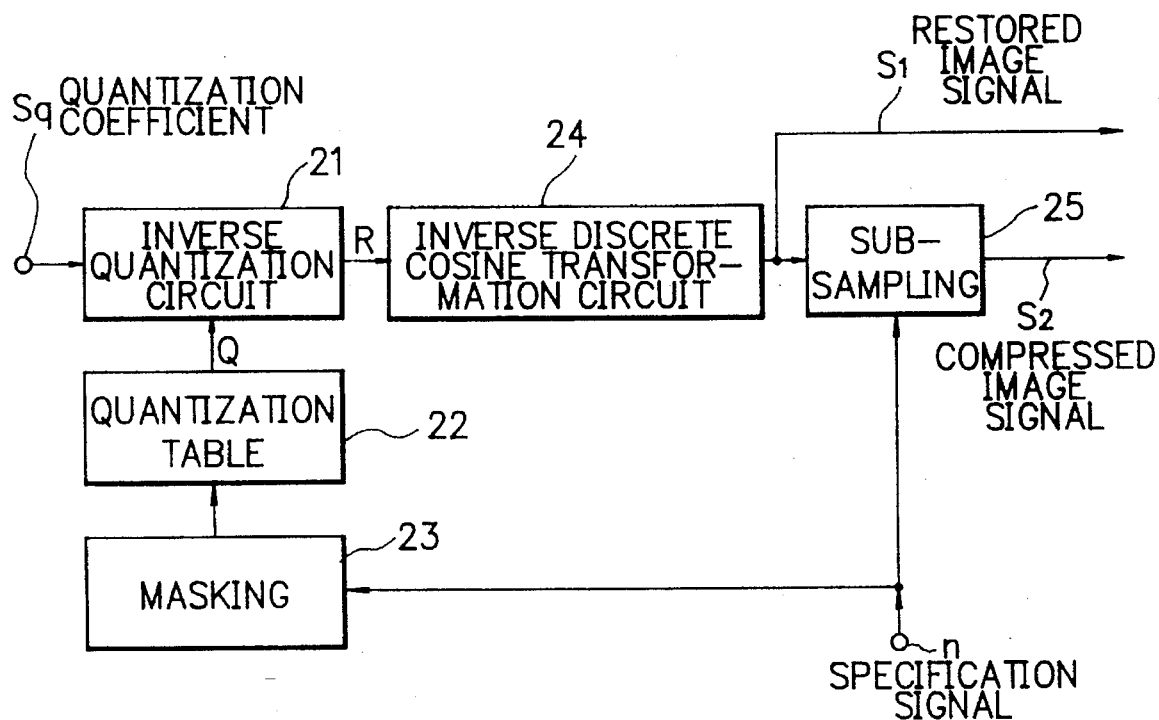
FIG. 4 is a block diagram showing an embodiment of the image sub-sampling apparatus in accordance with the present invention.

FIG. 4 schematically shows the constitution of an embodiment of the image sub-sampling apparatus in accordance with the present invention. As can be seen from the diagram, the system includes an inverse quantization circuit 21, a quantization table 22 containing values of a quantization step size in the format of a table for an inverse quantization, masking means 23 for masking the table 22, an inverse discrete cosine transformation circuit 24, and a sub-sampling circuit 25.

The circuit 21 references the contents of the table 22 to conduct a linear inverse quantization for a quantization coefficient Sq so as to produce inversely quanti zed data R.

The means 23 replaces each value of a portion of the table 22, primarily, a high-frequency portion with "0", thereby achieving the masking operation. As a result, of the data R produced from the circuit 21, each value of data corresponding to the portion masked by the table 22 is set to "0". Moreover, the data inversely quantized by the circuit 21 is fed to the circuit 24 to undergo an inverse discrete cosine transformation, thereby generating a restored image signal $S_1$. The signal $S_1$ is then fed to the circuit 25. According to an n specification signal, the signal $S_1$ is subjected to an n-dot sub-sampling operation in the circuit 25. Namely, in each of the vertical and horizontal directions, the data is sub-sampled such that every n dots are reduced to one dot, thereby producing a compressed image signal $S_2$.

In operation, a quantization coefficient Sq(V, U) in the form of an (8×8) matrix is delivered to the circuit 21. A quantization step size A(V, U) stored in the table 22 is multiplied by each element of the matrix to create inversely quantized data R(V, U). The size Q(V, U) of the table 22 is obtained by substituting each value of the high-frequency portion of the table 22 for "0" by the masking means 23. Each value of the inverse quantization data corresponding to the portion replaced by "0" becomes "0". The obtained data R(V, U) is input to the circuit 24 to undergo an inverse transformation according to the following expression (1) such that the resultant data is fed to the sub-sampling circuit 25.

$$r(i,j) = \frac{1}{4} \Sigma\Sigma C(u)C(v) \cdot \cos\frac{(2i+1)u\pi}{16} \cdot \cos\frac{(2j+1)v\pi}{16} \cdot R(u,v) \quad (1)$$

where, $c(u)=1/\sqrt{2}$ for u=0 and c(u)=1 for u≠0, $c(v)=1/\sqrt{2}$ for v=0 and c(v)=1 for v≠0, r(i,j) indicates an output pixel, and R(u,v) denotes a DCT coefficient.

In the circuit 25, the data r(V, U) is sub-sampled depending on the n specification signal. Namely, in the vertical and horizontal directions, one dot is acquired as an output for every n dots. For example, when the value of n is two, there are extracted from the data r(V, U) data items represented as V=2M and U=2N (M, N,=O, 1, 2, 3). As a result, the reduced image signal $S_2$ is created from the circuit 25.

Description will now be given of the masking means 23 of the embodiment. In this means 23, according to the n specification signal supplied thereto, each value of the data area beyond 1/n of the original size of the table 22 in the vertical and horizontal directions is replaced with "0". For example, in a case where n=2, each value of a portion of Q(V, U) represented with V≧4 and U≧4 is substituted for "0". With this provision, the operation procedure to delete the high-frequency components can be altered according to the sub-sampling ratio.

As above, in the apparatus, a portion of the quantization table 22 is masked to set each value of a high-frequency portion of the table 22 to "0" such that the inverse quantization is carried out according to the contents of the table 22, thereby preventing occurrence of the aliasing noise.

In consequence, without using such an expensive device as a low-pass filter, which has been necessitated in the prior art, it is possible to prevent the aliasing noise from being generated.

Figure 1:
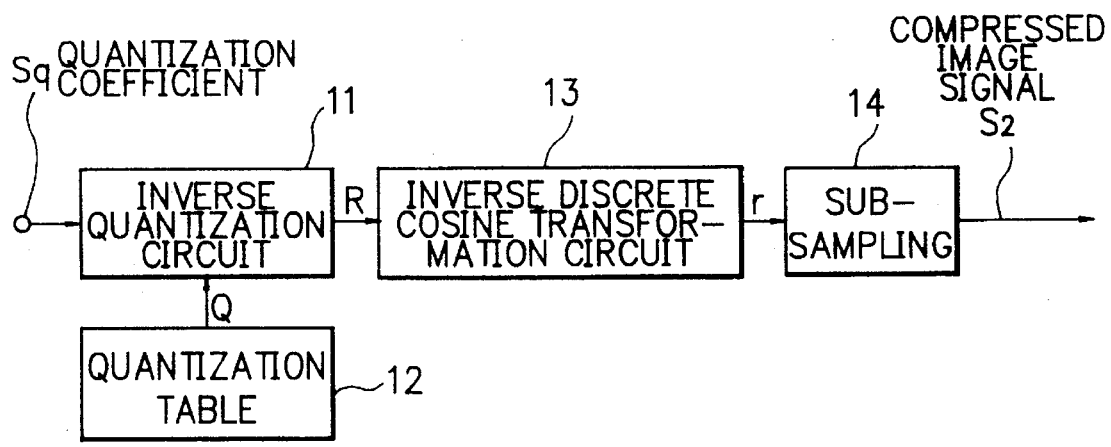
FIG. 1 is a schematic block diagram showing a first example of the conventional image sub-sampling apparatus.
Figure 2:
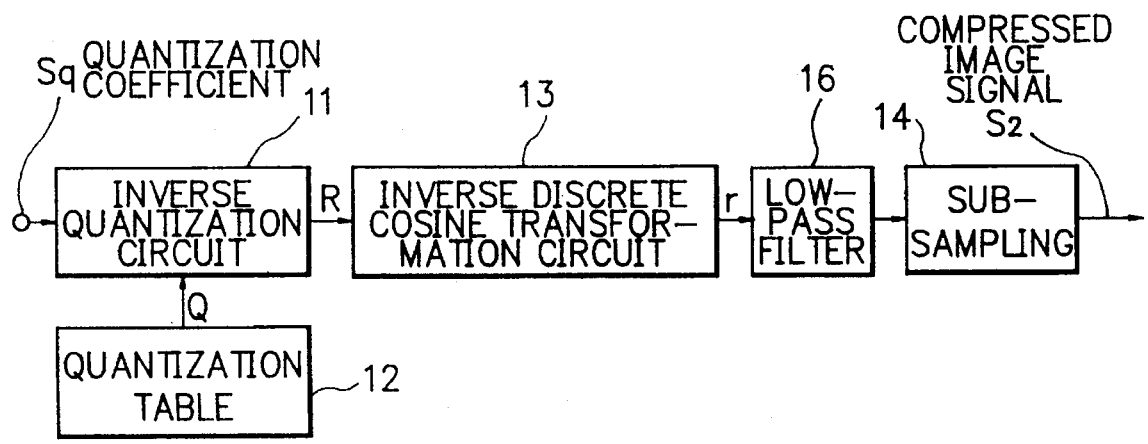
FIG. 2 is a block diagram illustratively showing a second example of the image sub-sampling apparatus of the prior art.
Figure 3:
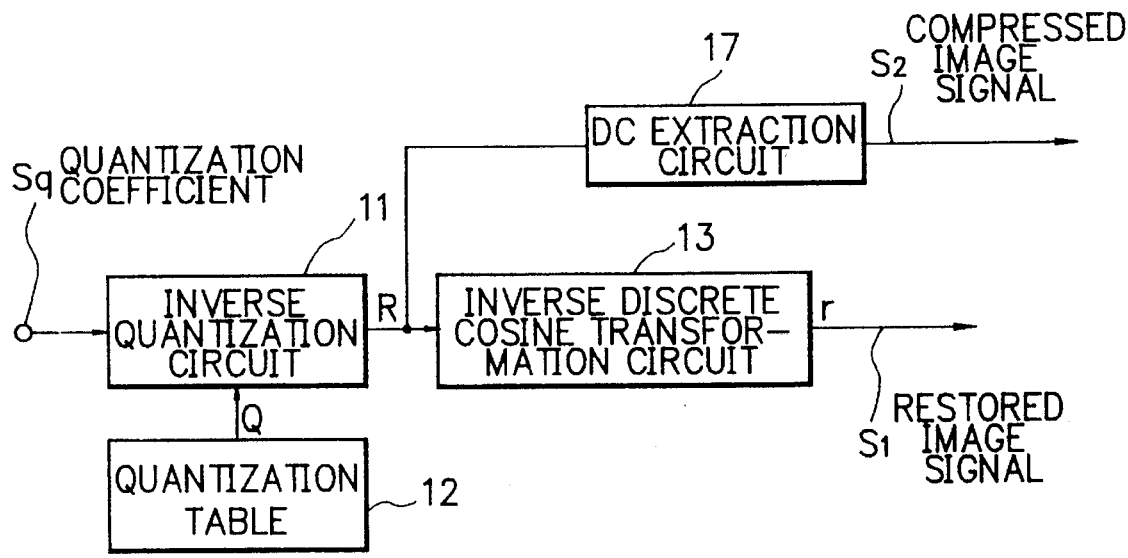
FIG. 3 is a schematic block diagram showing a third example of the conventional image sub-sampling apparatus.

Furthermore, in the conventional system shown in FIG. 3, the dc components are extracted from the inversely quantized data to be output without conducting the inverse transformation. Consequently, the image sub-sampling ratio cannot be selected. However, according to the image sub-sampling apparatus of the present invention, either one of the sub-sampling ratios 1/2, 1/4, and 1/8 can be selected according to the n specification signal.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. An image data sub-sampling apparatus for converting digital image data, encoded in a form of a frequency component matrix, by a discrete cosine transformation and a linear quantization, into decoded image data in the form of the frequency component matrix, and for sub-sampling a subset of said decoded image data, comprising:

a quantization table which lists a set of variables representing a quantization step size in the form of the frequency component matrix;

masking means for masking a portion of said quantization table in accordance with a specification signal representing a value n, where n is an integer, said masking means masking, according to said specification signal input thereto, an area beyond 1/n of said quantization table in a row direction and a column direction of said quantization table, wherein each value of said variables in said area is set to zero;

inverse quantization means for linear and inverse quantizing said image data by multiplying said image data with said variables representing said quantization step size, and for outputting inverse quantized image data;

inverse discrete cosine transformation means for converting said inverse quantized image data by an inverse discrete cosine transformation thereof to obtain said decoded image data; and sub-sampling means for sub-sampling said subset of said decoded image data in accordance with a sub-sampling ratio, determined from said specification signal supplied to said sub-sampling means, and for outputting compressed image data.

2. The image data sub-sampling apparatus as claimed in claim 1, wherein said frequency component matrix comprises a first number of rows and a second number of columns, components of said frequency component matrix corresponding to said sub-sampling ratio are represented in a row direction by an l-th row, where l is equal to said first number divided by said value n, and in a column direction by an m-th column, where m is equal to said second number divided by said value n; and wherein said decoded image data are sub-sampled at every l-th row and every m-th column.

\* \* \* \* \*

UNITED STATES PATENT AND TRADEMARK OFFICE
CERTIFICATE OF CORRECTION

PATENT NO. : 5,565,925
DATED : October 15, 1996
INVENTOR(S) : Shigenori KINOUCHI, et al.

It is certified that error appears in the above-indentified patent and that said Letters Patent is hereby corrected as shown below:

Column 1, line 63, after "signal" insert -- $S_2$. --.

Column 3, line 53, delete "quanti zed" and insert -- quantized --.

Signed and Sealed this

Seventh Day of January, 1997

Attest:

BRUCE LEHMAN

Attesting Officer    Commissioner of Patents and Trademarks